United States Patent [19]

Burke, Jr.

[11] E Re. 31,062

[45] Reissued Oct. 19, 1982

[54] LIMITED-ROTATION MOTOR WITH INTEGRAL DISPLACEMENT TRANSDUCER

[75] Inventor: Edward F. Burke, Jr., Reading, Mass.

[73] Assignee: MFE Corporation, Salem, N.H.

[21] Appl. No.: 188,010

[22] Filed: Sep. 17, 1980

Related U.S. Patent Documents

Reissue of:

[64] Patent No.: 4,189,699
Issued: Feb. 19, 1980
Appl. No.: 906,712
Filed: May 17, 1978

U.S. Applications:

[62] Division of Ser. No. 785,912, Apr. 8, 1977, Pat. No. 4,110,879.

[51] Int. Cl.[3] ..... H02K 33/00

[52] U.S. Cl. ..... 335/229; 310/29; 310/36; 361/292

[58] Field of Search ..... 310/36, 29, 37, 38, 310/72, 39; 335/230, 229, 272; 318/127-132; 350/6

[56] References Cited

U.S. PATENT DOCUMENTS

| | | | |
|---|---|---|---|
| Re. 26,749 | 1/1970 | Montagu | 335/229 |
| 2,426,199 | 8/1947 | Gould | 310/219 UX |
| 3,337,789 | 8/1967 | Ono et al. | 361/292 X |
| 3,517,282 | 6/1970 | Miller | 361/292 X |
| 3,652,955 | 3/1972 | Cruger | 318/128 X |
| 4,110,879 | 9/1978 | Burke, Jr. | 310/36 |
| 4,135,119 | 1/1979 | Brosens | 318/128 |

*Primary Examiner*—B. Dobeck
*Attorney, Agent, or Firm*—Cesari and McKenna

[57] ABSTRACT

The armature of a limited-rotation motor which rotates about an axis relative to a stator is extended axially beyond the stator between arcuate, non-magnetic capacitor plates disposed in a cylindrical array coaxial with the rotation axis. The capacitor plates are connected in a bridge circuit whose output is a selected function of armature displacement. The capacitor plates are installed at the end of the motor stator during assembly of the motor as tines of a unitary slotted bushing that is reamed simultaneously with the motor stator, following which the bushing is circumferentially cut to electrically isolate the bushing tines to form the individual plates.

5 Claims, 4 Drawing Figures

LIMITED-ROTATION MOTOR WITH INTEGRAL DISPLACEMENT TRANSDUCER

Matter enclosed in heavy brackets [ ] appears in the original patent but forms no part of this reissue specification; matter printed in italics indicates the additions made by reissue.

This is a division of application Ser. No. 785,912, filed Apr. 8, 1977, now U.S. Pat. No. 4,110,879.

BACKGROUND OF THE INVENTION

This invention relates to a limited rotation motor and method of making same. It relates more specifically to a motor of this type having an integral, variable capacitance displacement transducer.

The motor is designed for limited angular movement, as opposed to ordinary motors capable of an unlimited number of revolutions. It is used in various applications as torque motors for servo valves, meter movements, as well as to drive the marking pens of recorders. In these devices the armature generally rotates against a spring and the amount of rotation is limited by the reaction torque of the spring, which opposes the torque developed by the motor. The motor torque, on the other hand, is a function of the control current applied to the motor.

One motor such as this is described in U.S. Pat. No. Re. 26,749. A magnetic armature is mounted for rotation about an axis coaxial with a pair of stationary poles disposed on diametrically opposite sides of the armature. A permanent magnet supplies a static field passing from one pole to the other through the armature. At least one of the poles is split, with a slot extending parallel to the armature axis to divide the pole into a pair of pole pieces. The armature extends across this gap and is thus disposed opposite a part of each of the pole pieces.

Current through a control coil mounted on the stator develops a magnetic field extending from one of the pole pieces into the armature and back to the other of the pole pieces. Thus, depending upon the direction of the current, the control field developed by the coil adds to the static field on one side of the slot and substracts from it on the other side. The armature is thus subjected to a force in the direction of the stronger field and rotates in that direction about its axis. Generally, the angular displacement of the armature is directly relates to the input current to the motor.

In order to sense the angular displacement of the armature, it is common practice to couple a rotation-sensitive transducer to the motor. The transducer may then be incorporated into a circuit which produces a position feedback signal proportional to armature displacement.

In many cases, the rotation-sensitive transducer is a variable capacitance transducer that is mounted directly on the motor. Typical prior variable capacitance transducers include a pair of spaced-apart stationary plates between which is disposed a movable plate coupled to rotate with the motor armature parallel to the stationary plates. The movable plate may be electrically conductive or non-conductive. In either event, it functions to make the output capacitance of the transducer a sensitive function of armature displacement. Typical transducers of this general type are disclosed, for example, in U.S. Pat. Nos. 3,517,282 and 3,668,672.

In some applications, it is desirable, if not absolutely necessary, that the motor armature displacement be very uniform for all displacement angles and that the motor have almost unlimited resolution. This, in turn, requires that the motor armature and stator be absolutely concentric and that the armature rotate freely relative to the stator and have no axial displacement. Also, the capacitance of the armature displacement transducer must be related exactly to armature displacement which requirement is hard to achieve with the typical parallel-plate transducers described in the aforementioned patents. This is because it is difficult to mount and maintain spaced-apart plates so that they are exactly parallel to one another, particularly when the motor is being used in areas of high vibration. Also in motors where the armature shaft is used to drive a conductive movable plate, "end play" of the shaft causes unwanted variations in the transducer capacitance as the motor armature rotates.

Also some prior arrangements require slip rings for flexible "pigtail" wires in order to make electrical connections to one or another of the capacitor plates. Accordingly, conventional limited rotation motors with variable capacitance transducers for use in applications requiring a high degree of accuracy and resolution have proven to be difficult to manufacture, at least on an economical basis.

SUMMARY OF THE INVENTION

Accordingly, the present invention aims to provide a limited rotation motor having an integral capacitive armature displacement transducer.

A further object of the invention is to provide a motor of this type which is compact and thus adapted for use in miniaturized equipment.

A further object of the invention is to provide a motor of this general type whose output torque bears a selected relationship to input current with a high degree of accuracy.

A further object of the invention is to provide a limited rotation motor with an integral armature displacement transducer that is relatively easy and inexpensive to manufacture.

A further object is to provide a torque motor having an integral variable capacitance transducer whose capacitance is precisely related to armature displacement.

Still another object of the invention is to provide a method of making a limited rotation motor with an integral displacement transducer having one or more of the above characteristics.

Other objects will, in part, be obvious and will, in part, appear hereinafter.

The invention accordingly comprises the several steps and the relation of one or more of such steps with respect to each of the others, and the article possessing the features, properties and relation of elements which are exemplified in the following detailed description, and the scope of the invention will be indicated in the claims.

Briefly, the motor made in accordance with this invention has an armature mounted for rotation about an axis between stator pole pieces concentric with that axis. The motor armature is made longer than usual so that one end extends beyond the stator pole pieces into a space between arcuate non-magnetic capacitor plates positioned beyond the stator in a cylindrical array that is concentric with the axis of rotation of the armature.

Thus a portion of the armature actually forms the movable element of the displacement transducer.

The motor stator and the capacitor plates are assembled in a common housing and the armature end shafts projecting from the opposite ends of the armature are mounted so that the armature can rotate freely within the housing. One shaft integral with the armature, i.e. the output shaft, projects from the housing and is arranged to be connected to a recording pen, valve or other device being driven by the motor. A spring acting between the armature and the housing normally biases the armature to a neutral or reference position.

In use, current through a control coil mounted on the stator develops a magnetic field that causes the armature to rotate within the housing in one direction or the other from its reference position depending upon the direction of the exciting current. The capacitor plates and armature are connected electrically into an appropriate bridge circuit whose output thereupon reflects the angular displacement of the armature from its reference position.

The motor is fabricated by first assembling the stator components around a mandrel. The stator assembly is then placed in a potting mold with a bushing for the armature output shaft bearing being positioned at one end of the assembly.

Also placed in the mold is an elongated, cylindrical, flanged bushing made of electrically conductive material such as brass. The bushing has the same inside diameter as the arcuate pole pieces and has at least one pair of length-wise slots evenly distributed about its circumference, forming one or more pairs of arcuate tines or teeth. Electrical leads are connected to the outer surface of each tine in the pair. This bushing is positioned in the mold just beyond the opposite end of the stator assembly and coaxially with the stator pole pieces.

Following this, the mold is filled with epoxy resin or other potting compound. The potting compound mechanically interconnects the bushings and the stator, forming a rugged, impact-resistant, unitary housing structure. The electrical leads from the stator control winding and the bushing tines extend out of the structure for connection to external circuitry.

The structure thus has an elongated cylindrical bore extending lengthwise through it occupied by the mandrel and whose ends are terminated by the bushings. After the potting compound sets, the mandrel is removed. Next, the bushing is cut through circumferentially near its outer end thereby separating the bushing tines from the flanged bushing collar so that the tines become precisely spaced-apart, arcuate capacitor plates. Finally, the bore extending through the structure is reamed or honed in a single reaming operation to ensure that the bore has the requisite clearance with the motor armature and also to ensure that the pole pieces and also the inside surfaces of the capacitor plates have the same radius and are both perfectly concentric with the same axis.

The motor is completed by inserting the armature into the bore, the armature output shaft being rotatively mounted in its bushing and the other armature shaft being similarly mounted in the bushing collar remaining beyond the capacitor plates. The fact that the armature, including the portion comprising the movable element of the displacement transducer, is one piece and mounted in bushings formed at the same time as the capacitor plates and pole pieces assures that the armature and its extension are coaxial with the stationary elements thus maximizing the uniformity, reliability and accuracy of the present motor.

Using this mode of making a limited-rotation motor with integral displacement transducer, an accurate fixed relationship can be maintained between the capacitance of the transducer and armature displacement over the entire armature displacement range. Since the stationary capacitor plates are imbedded right in the potting compound forming the housing and since the movable "plate" consists of an extension of the relatively stiff motor armature, the capacitance of the transducer remains unaffected by external vibrations. Also, with appropriate dimensioning and shaping of the bushing tines or the armature extension, the capacitance of the displacement transducer can be made to have a linear or selected nonlinear relationship with armature displacement. Yet with all of these advantages, the cost of making the subject motor is not appreciably more than the cost of making a conventional one because the manufacture of the motor relies on conventional techniques and requires only a slightly longer armature and a slotted bushing in addition to the usual motor components.

BRIEF DESCRIPTION OF THE DRAWINGS

For a fuller understanding of the nature and objects of the invention, reference should be had to the following detailed description taken in connection with the accompanying drawings, in which.

DESCRIPTION OF THE PREFERRED EMBODIMENT

Figure 1:
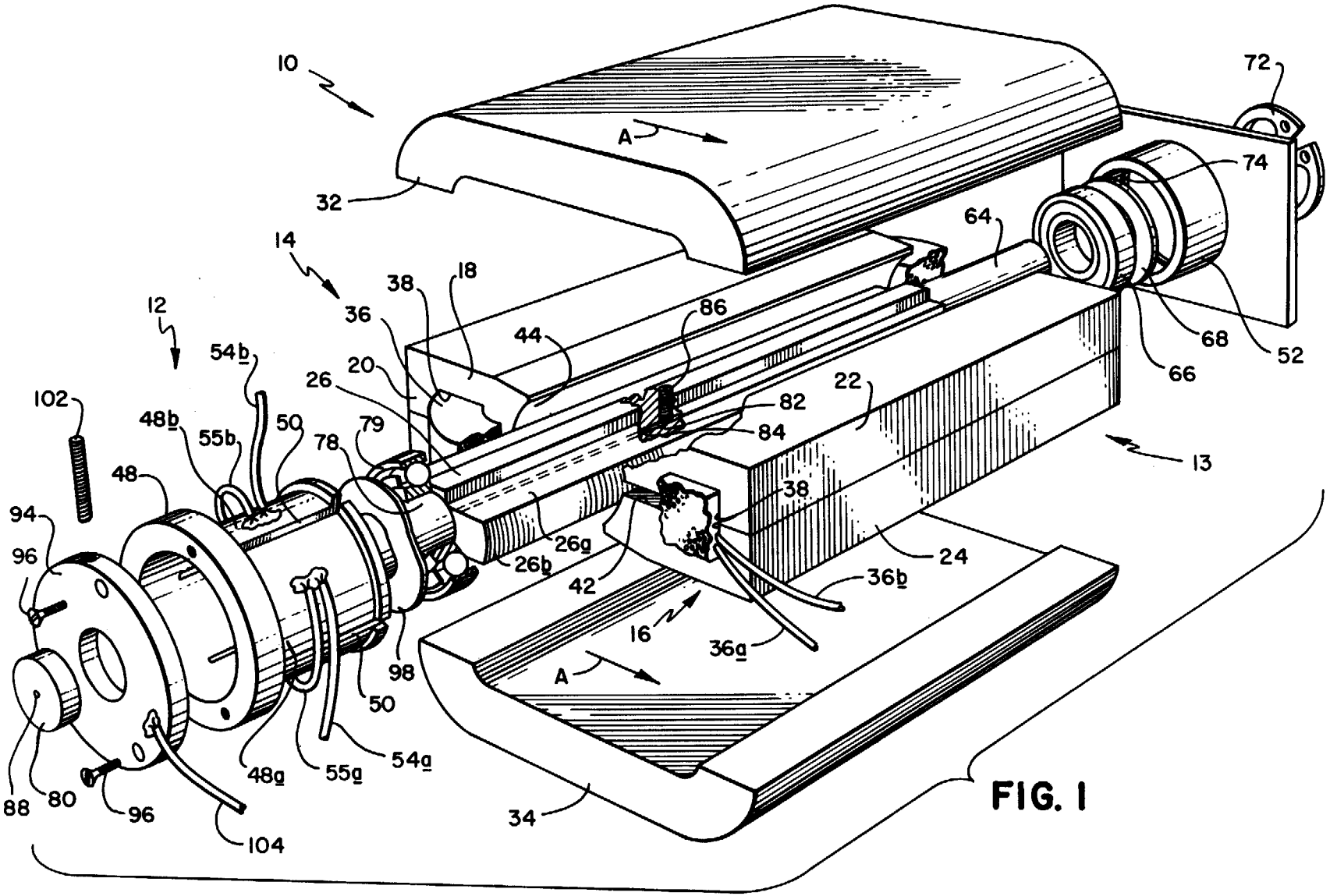
FIG. 1 is a perspective view partially exploded with some parts cut away of a limited rotation motor made in accordance with this invention, partially completed and showing the relative positions of the motor parts.
Figure 2:
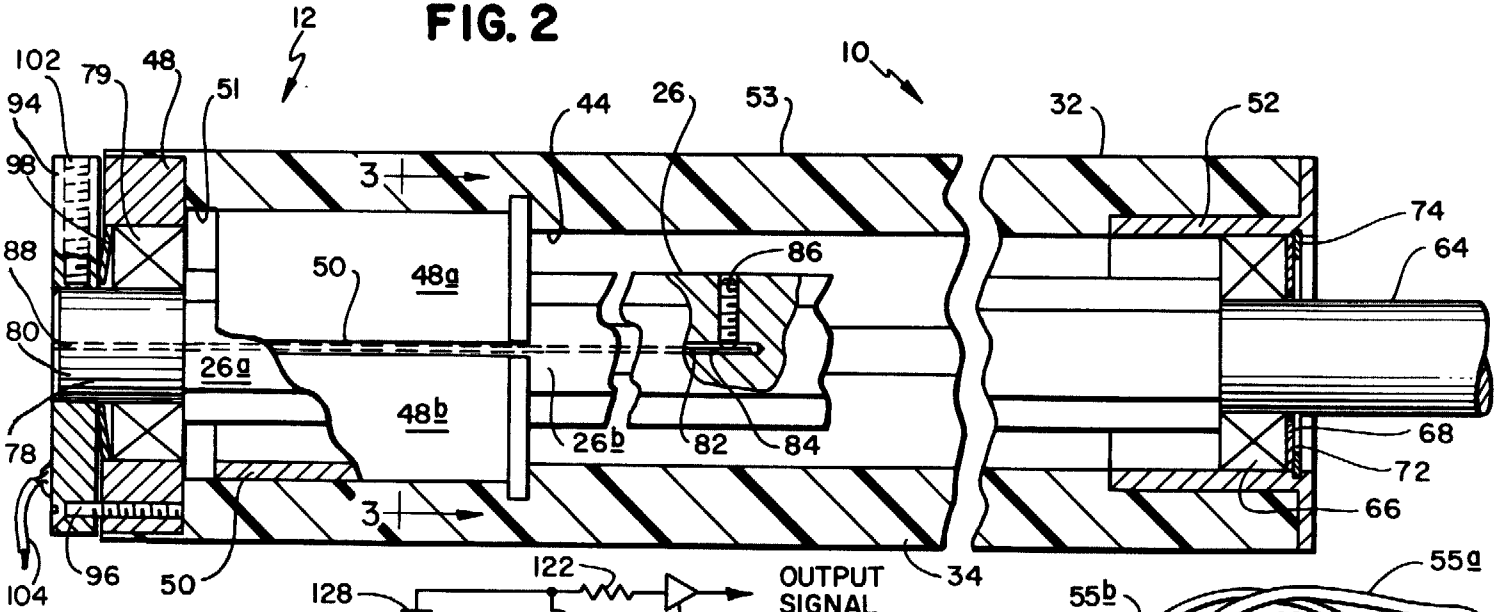
FIG. 2 is a view in medial section with parts shown in elevation of the FIG. 1 motor fully completed.

Referring to FIGS. 1 and 2 of the drawings, the subject motor has a drive section indicated generally at 10 and an integral, variable-capacitance, armature displacement transducer shown generally at 12. The drive section includes a stator 13 having a pair of elongated poles indicated generally at 14 and 16, formed by pole pieces 18, 20, 22 and 24 and an armature 26 disposed between poles 14 and 16. The poles 14 and 16 serve as flux carriers for permanent magnets 32 and 34. The magnets 32 and 34 develop magnetic fields in the same direction with respect to the poles 14 and 16, as indicated by arrows A in FIG. 1.

A control coil 36 extends through longitudinal apertures 38 in the pole pieces and around armature 26. The apertures 38, together with slots 42, separate the pole pieces 18 and 20 and the pole pieces 22 and 24. The interior faces of the pole pieces are arcuate and when the motor stator 13 is assembled, the pole pieces define an elongated cylindrical bore 44 extending the length of the stator 13.

As best seen in FIG. 2, a cylindrical flanged bushing collar 48 having the same inside diameter as bore 44 is positioned beyond one end of the stator 13, coaxially with bore 44 and terminating one end of the bore. Between the collar and stator are at least one pair of precisely spaced-apart, coextensive arcuate capacitor "plates" 48a and 48b disposed in a circular array that has the same diameter as the bore 44 and is concentric with the bore.

In the illustrated embodiment, there are two pairs of plates 48a, 48b with corresponding plates in each pair being diametrically opposite one another. The plates are separated from each other by narrow lengthwise slots 50 and they are also separated from bushing collar 48 by a narrow circular channel or slot 51 (FIG. 2). The bushing collar 48 and plates 48a, 48b are all made of a nonferromagnetic material such as brass. The collar 48 rotatively supports one end of armature 26 by way of a bearing unit 79 and a second bushing 52 positioned beyond the opposite end of stator 13 terminates the opposite end of bore 44 and rotatively supports the opposite end of the armature via a bearing unit 66.

The poles 14, 16, the magnets 32 and 34, the coil 36 and the bushings 48 and 52 are all imbedded in a mass 53 (FIG. 2) of potting compound such as epoxy resin which preserves the relative positions of these components and incapsulates them forming a rugged housing structure. The potting compound penetrates into the gaps 42 between the pole pieces and into the slots 50 between the capacitor plates. Being electrically nonconductive, the compound provides electrical insulation at these locations.

Electrical leads 54a and 54b are soldered to the outside surfaces of plates 48a and 48b prior to potting and are led out of the housing structure, along with the leads 36a and 36b from coil 36. If as in the illustrated motor, there are two such plate pairs, an additional lead 55a is soldered between the corresponding plates 48a and in each pair and another lead 55b is connected between plates 48b in each pair so that the two pairs of plates function as a single plate pair.

The armature 26 is longer than usual, having a portion 26a that extends beyond the stator 13 and between the capacitor plates 48a, 48b. This armature portion functions as the movable capacitor plate of the displacement transducer 12. Armature 26 is formed with diametrically opposite arcuate surfaces 26b which are concentric with the axis of bore 44 and thus also with the arcuate surfaces of pole pieces 18, 20, 22, 24, as well as with the arcuate interior surfaces of the capacitor plates 48a, 48b and the interior surfaces of bushings 48 and 52. The radius of the armature surfaces is slightly less than the radius of the pole piece surfaces so as to leave a very narrow gap between the armature surfaces and the pole piece and capacitor plates surfaces.

A shaft 64 projects axially from the right hand end of armature 26 as viewed in FIGS. 1 and 2. The shaft 64 rotates in the bearing unit 66 which is retained in the bushing 52 by a washer 68. The washer, in turn, is backed up by a C-shaped spring retainer 72, that engages in an annular groove 74 in bushings 52, thereby providing an axial stop for the armature. The portion of the armature shaft 64 projecting beyond bushing 52 is arranged to be connected to a recording pen, servo valve or other device controlled by the motor.

A stub shaft 78, that projects axially from the opposite end of armature 26 rotates via the bearing unit 79 in bushing collar 48. Also an electrically conductive torsion spring 82 extends along an axial passage 84 in the armature. The end of the spring 82 inside the passage 84 is secured to the armature by suitable means such as a radial set screw 86 turned down into the armature so that it engages the spring or by brazing. The opposite end of spring 82 projects axially from the end of the armature through bearing unit 79. It is secured by brazing, solder or other electrically conductive means in an axial passage 88 in a short brass pin 80 positioned beyond bearing 79 and extending beyond bushing collar 48.

An annular, electrically conductive, retainer 94 engages around the portion of pin 80 projecting beyond the bushing collar 48. The retainer is, in turn, secured to the bushing 48 flange by means of screws 96 extending through the retainer and into threaded passages 97 in the bushing flange. A spring washer 98, encircling shaft 78, is compressed between the bearing unit 92 and retainer 94 to provide axial thrust on the armature 26, so that the armature has minimal axial play.

Also, when the retainer 94 is being secured to the bushing flange, relative movement is allowed between the pin 80 and the retainer so that there is no axial load placed on the torsion spring 82. After the retainer is secured in place, a radial set screw 102, threaded into retainer 94, is turned in so that it engages pin 80 thereby anchoring the outer end of the torsion spring 82 to the bushing 48. The spring 82 thereupon biases the armature 26 towards its neutral or reference position. The armature is rotated in one direction or the other from its reference position depending upon the direction of the current applied to the control coil 36.

The remaining electrical connection for the displacement transducer 12 is to the armature 26, which comprises the movable element of the transducer. However, a slip ring or flexible "pigtail" wire is not required to electrically connect to the armature. Rather, this is accomplished by connecting an electrical lead 104 (FIG. 2) to the stationary retainer 94 or to bushing 48. This is because those components are directly and reliably connected to armature 26 by way of pin 80 and the electrically conductive spring 82.

Figure 3:
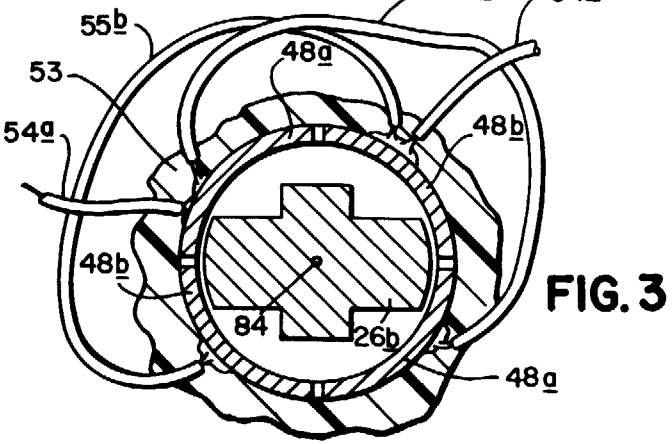
FIG. 3 is a sectional view along line 3—3 of FIG. 2.

Turning now to FIG. 3, the capacitance between each armature surface 26b and each of the plates in each pair 48a, 48b depends upon the area of the portion of the armature surface that is positioned opposite the respective plate 48a and 48b. If the armature is located at its reference position illustrated in FIG. 3, equal portions of each armature surface 26b overlap the two plates 48a and 48b in each pair. Consequently, the capacitance measured between armature 26 (taken at lead 104) and plate 48a (taken at lead 54a) equals the capacitance measured between the armature and plate 48b (taken at lead 54b). However, if the armature 26 is turned clockwise, more of each armature surface 26b is positioned opposite a plate 48a, then is located opposite a plate 48b. Consequently the capacitance between the armature and plates 48a is increased, while the capacitance between the armature and plates 48b is decreased. Conversely, if the armature 26 is moved in the opposite direction, the opposite situation prevails.

Figure 4:
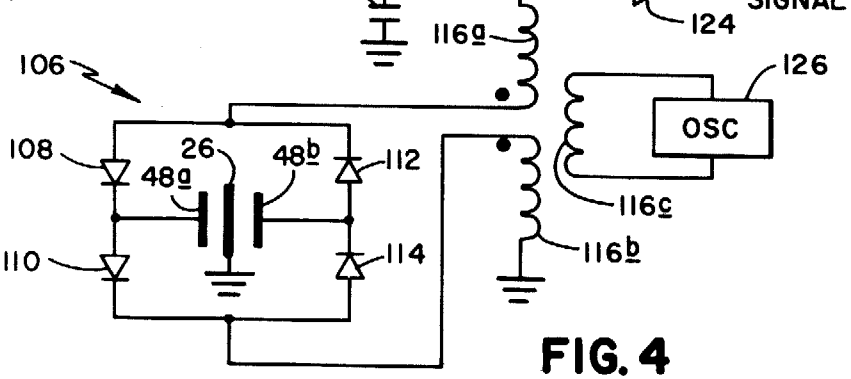
FIG. 4 is a schematic drawing of the FIG. 2 motor displacement transducer connected in a typical bridge circuit.

In use, the electrical leads 54a, and 54b, and 104 from the position transducer 12 may be connected into a conventional diode bridge circuit illustrated schematically at 106 in FIG. 4. Typically leads 54a and 54b are wound together since there is no capacitance between plates 48a and 48b and led out of the motor housing along one path. The remaining lead 104 is brought out of the housing along a different path so that there is no capacitance coupling between it and the other pair of leads. The output of the bridge circuit is a voltage which is related directly to the angular displacement of the armature 26. This voltage may be used, for example, as a position feedback signal in a servo system to control the current applied to the motor control coil 36.

Circuit 106 comprises a pair of diodes 108 and 110 connected as one pair of bridge arms and a second pair of oppositely directed diodes 112 and 114 connected as the other pair of bridge arms. The connections between diodes 108 and 112 and between diodes 110 and 114 are connected to corresponding ends of a pair of transformer secondary windings 116a and 116b. The opposite end of winding 116b is connected to ground, while the opposite end of winding 116a is connected via resistor 122 to the input of an amplifier 124 which delivers the circuit 106 output signal. The windings 116a and 116b are excited by the current in the transformer primary winding 116c, driven at a suitable frequency by an oscillator 126. A filter capacitor 128 is present between ground and the junction of winding 116a and resistor 122 to eliminate the a.c. component from the output signal.

The transducer 12 is connected into the bridge circuit as indicated, with the plate 48a connected between diodes 108 and 110 and plate 48b connected between diodes 112 and 114. The motor armature 26, on the other hand, is connected via its lead 104 directly to ground.

The motor described herein is quickly and easily assembled following, for the most part, conventional practices. Yet, the mode of making the integral displacement transducer insures that the output of the transducer bears exactly the desired relationship to the angular displacement of the motor armature 26.

More particularly, when assembling the motor, the pole pieces 18, 20, 22 and 24 are placed around the control coil 36 and cemented together to form poles 14 and 16. Then the magnets 32 and 34 are cemented to the pole pieces. A cylindrical mandrel (not shown) taking the place of the armature 26 is used to position the poles during the cementing and potting operations.

The bushing collar 48 and capacitor plates 48a, 48b are all formed together initially from a single elongated cylindrical brass bushing 48' best seen in FIG. 1. Bushing 48' is provided with four lengthwise slots 50 that extend along a major part of the bushing length and terminate at the bushing collar 48. These slots define two pairs of coextensive arcuate tines 48a and 48b, the corresponding tines in each pair being diametrically opposite one another. The interior diameter of bushing 48' is substantially the same as the diameter of bore 44.

The electrical leads 54a, 54b, 55a, 55b are soldered to the outside surfaces of the bushing tines as seen in FIG. 3. Then the cemented stator parts, along with bushings 48' and 52 are arranged coaxially on the aforesaid mandrel in their ultimate positions shown in FIG. 2, in a housing or potting mold. Then the mold is filled with an electrically nonconductive potting compound which fills the gaps 42 between the pole pieces and also the slots 50 between the bushing tines. The mandrel prevents the potting compound from flowing into bore 44 and the interior of bushing 48'. When the potting compound sets, it rigidly maintains the relative positions of the pole pieces and bushings 48' and 52.

Following this, the mandrel is removed and a cutting tool is inserted into bushing 48' and the circular cut 51 is made in the bushing 48' to separate the bushing tines 48a, 48b from each other and from the bushing collar 48, thereby forming the separate electrically isolated capacitor plates 48a, 48b for the position transducer 12.

Next, the passage 44 is reamed or honed out in the usual way to provide the requisite clearance for the armature 26 and to insure concentricity of the pole pieces and the armature surfaces 26b. In the process of doing this, the bushing collar 48 and bushing 52 and plates 48a, 48b are simultaneously honed ensuring near perfect alignment and concentricity between these elements and the armature surfaces 26b. The honing operation also removes any burrs that might have been created when the circular cut 51 was made in the bushing 48'. The single honing operation thus insures that the gap between the armature surfaces 26b and pole pieces and capacitor plates 48a, 48b is of the correct size and is completely uniform for all angular positions of the armature.

Following the reaming operation, the retainer spring 72 is inserted into groove 74 in bushing 52 and the armature 26, carrying the bearing units 66 and 79 and washers 68 and 98, is slid into passage 44. When the armature is properly seated with washer 68 bearing against retainer 72, the retainer 98 is engaged over pin 80 and secured to the bushing flange with screws 96. Finally, the pin 80 is anchored to the retainer 98 by tightening the set screw 102.

It can be seen from the foregoing that the capacitance of the displacement transducer 12 can be made to have a selected relationship to armature displacement by appropriately shaping and dimensioning the preformed slots 50 in bushing 48'. For example, the output of the transducer can be linearly related or it can be made proportional to the tangent of the armature displacement angle or it can be logarithmically related, depending upon the particular application.

It will also be appreciated that this relationship can be precisely controlled and made uniform for all displacement angles of the armature because the transducer's stationary capacitor plates are part of the same structure and are formed concurrently with, the motor stator and its movable plate comprises an integral extension of the rigid armature. Still with all of these advantages, the cost of making the present motor is not appreciably greater than the cost of manufacturing a conventional torque motor because precisely the same manufacturing techniques are employed and the only added components required are the slightly longer armature 26 and the nonferromagnetic bushing 48' that cooperate to form the displacement transducer 12.

It will thus be seen that the objects set forth above, among those made apparent from the preceding description, are efficiently attained and, since certain changes may be made in carrying out the above method and in the article set forth without departing from the scope of the invention, it is intended that all matter contained in the above description or shown in the accompanying drawings should be interpreted as illustrative and not in a limiting sense.

It is also to be understood that the following claims are intended to cover all of the generic and specific features of the invention herein described.

I claim:

1. A limited rotation motor of the type having an array of pole pieces defining a cylindrical passage and an armature rotatively mounted coaxially in the passage and biased toward a reference position, the improvement comprising A. a bushing *composed of a collar and a body* made of an electrically conductive nonferromagnetic material having an inside diameter that is equal to the diameter of said passage and positioned coaxially with the passage so that the bushing forms an extension of said passage, B. means defining lengthwise slits in the bushing *body* so as to form at least one pair of tines, C. means defining a circular cut in the bushing that separates the tines from each other and from the bushing collar so as to electrically isolate the tines, [and]

D. an integral extension on the armature that projects beyond the poles pieces [through] *into* the bushing so that the opposing surfaces of the armature and the tines form an armature displacement transducer *having electrical capacitance* whereby the differential capacitance between the armature surfaces and the tines provides an indication of armature angular displacement[.] *and*

*E. means including said collar for rotatively supporting the adjacent end of said armature.*

2. The motor defined in claim 1 [and further including] *wherein the supporting means includes*

A. a shaft projecting axially from one end of the armature,

B. means for journalling the shaft in the bushing collar beyond the bushing tines, C. an electrically conductive torsion spring connected to the armature and extending axially from the armature through the shaft and through the bushing collar, D. means for conductively anchoring the outer end of the spring to the bushing *collar*, and E. means for establishing an electrical connection to the armature by way of the spring.

3. The motor defined in claim 1 [and further including] *wherein the supporting means includes*

A. a shaft projecting axially from one end of the armature, and

B. means for journalling the shaft in the bushing collar beyond the bushing tines.

4. The motor defined in claim 3 and further including

A. a torsion spring connected to the armature and extending axially from the armature through the shaft and through the bushing collar, and B. means for rotatively anchoring the outer end of the spring.

5. The motor defined in claim 4 wherein the torsion spring and anchoring means are electrically conductive.

* * * * *